(12) United States Patent
Strong (10) Patent No.: US 7,656,969 B2
(45) Date of Patent: Feb. 2, 2010

(54) DUAL PAYLOAD AND ADAPTIVE MODULATION

(75) Inventor: Peter Strong, Newton Abbot (GB)

(73) Assignee: Motorola, Inc., Schaumburg, IL (US)

( * ) Notice: Subject to any disclaimer, the term of this patent is extended or adjusted under 35 U.S.C. 154(b) by 611 days.

(21) Appl. No.: 11/332,827

(22) Filed: Jan. 13, 2006

(65) Prior Publication Data

US 2006/0160495 A1 Jul. 20, 2006

Related U.S. Application Data

(60) Provisional application No. 60/644,281, filed on Jan. 14, 2005.

(51) Int. Cl.
*H03K 9/00* (2006.01)
*H03C 7/02* (2006.01)
*H04B 7/00* (2006.01)
*H04K 1/10* (2006.01)
*H04L 27/00* (2006.01)

(52) U.S. Cl. .................. 375/316; 455/101; 455/500; 375/260; 375/295

(58) Field of Classification Search .............. 375/316, 375/260, 295; 455/101, 500
See application file for complete search history.

(56) References Cited

U.S. PATENT DOCUMENTS 6,185,418 B1 * 2/2001 MacLellan et al. .......... 455/418
6,473,467 B1 * 10/2002 Wallace et al. .............. 375/267
6,587,157 B1 * 7/2003 Guyot et al. ................ 348/714
6,760,882 B1 * 7/2004 Gesbert et al. .............. 714/774
6,771,706 B2 8/2004 Ling
2002/0018483 A1 * 2/2002 Kuwabara et al. ........... 370/430
2002/0154705 A1 10/2002 Walton
2003/0125040 A1 * 7/2003 Walton et al. ............... 455/454
2004/0162093 A1 * 8/2004 Bevan et al. ................ 455/502
2004/0179627 A1 9/2004 Ketchum
2005/0094598 A1 * 5/2005 Medvedev et al. .......... 370/329
2006/0018287 A1 * 1/2006 Walton et al. ............... 370/334
2007/0071127 A1 * 3/2007 Gore et al. .................. 375/267

OTHER PUBLICATIONS

Korean Search Report Dated Apr. 14, 2009.
PCT Search Report Dated Aug. 22, 2007.

* cited by examiner

*Primary Examiner*—Mohammad H Ghayour
*Assistant Examiner*—Sarah Hassan
(74) *Attorney, Agent, or Firm*—Lalita W. Pace; Anthony P. Curtis (57) ABSTRACT

A wireless broadband communications system that provides higher performance and increased spectral efficiency in point-to-point and point-to-multipoint applications. The wireless communications system includes a plurality of transceivers and a plurality of transmit and receive antennas. The system can be configured as a 1:n SIMO system that transmits and receives signals over a single channel of information flow, or an n:n MIMO system that transmits and receives signals over multiple channels of information flow, based upon channel state information and average vector error measurement values corresponding to the respective channels of information flow, which are determined by the system via an adaptive modulation technique.

40 Claims, 4 Drawing Sheets

DUAL PAYLOAD AND ADAPTIVE MODULATION

CROSS REFERENCE TO RELATED APPLICATIONS

This application claims benefit of U.S. Provisional Patent Application No. 60/644,281 filed Jan. 14, 2005 entitled DUAL PAYLOAD AND ADAPTIVE MODULATION.

STATEMENT REGARDING FEDERALLY SPONSORED RESEARCH OR DEVELOPMENT

N/A

BACKGROUND OF THE INVENTION

The present invention relates generally to wireless communications systems, and more specifically to a high performance wireless broadband communications system that provides increased spectral efficiency in point-to-point and point-to-multipoint applications.

U.S. patent application Ser. No. 11/115,943 filed Apr. 27, 2005 entitled MULTIPLE INPUT MULTIPLE OUTPUT (MIMO) WIRELESS COMMUNICATIONS SYSTEM (the "'943 application") and assigned to the same assignee of the present invention discloses a wireless broadband communications system that can be configured as a line-of-sight (LOS) or a non-line-of-sight (NLOS) wireless communications system. As disclosed in the '943 application, the LOS and NLOS configurations of the wireless communications system can be deployed in both point-to-point and point-to-multipoint applications, in which at least one transmitter disposed at one end of a communications link transmits data signals over one or more communications channels using specified space-time coding and modulation techniques, and at least one receiver disposed at the other end of the link captures the transmitted data signals and employs specified signal processing techniques to decode and demodulate the signals to recover the user data. The LOS and NLOS system configurations disclosed in the '943 application may employ adaptive modulation techniques to adjust various transmission parameters such as the coding rate and the modulation mode to compensate for changes in channel characteristics that can adversely affect the quality and the rate of the data transmission.

One problem facing wireless broadband communications systems like those disclosed in the '943 application is the ever increasing demand for higher data transmission rates, which is driven in large part by increasing demands for multi-media data services involving, e.g., text, graphics, video, animation, and/or sound. This problem is exacerbated by a number of aspects of the environments in which wireless communications systems are currently being deployed, such as the limited bandwidth capacity of the communications channels available for use by the systems.

For example, in a conventional wireless broadband communications system, data corresponding to a single communications session is typically transmitted from at least one transmitter to at least one receiver over one or more communications channels, each of which is generally defined within a limited portion of the electromagnetic spectrum allocated to the system. To achieve more efficient use of the allocated spectrum, digital communications techniques have been employed in such systems to allow data packets corresponding to multiple communications sessions to be transmitted over one or more shared channels, obviating the need to dedicate one or more channels for each communications session. Such digital communications techniques are commonly employed in wireless communications networks including one or more wireless LANs (WLANs), which typically utilize data packet protocols to communicate between the various nodes of the WLAN. Wireless communications systems may also be configured to operate in shared frequency bands such as the unlicensed frequency band for WLANs located at 5 GHz.

Conventional wireless broadband communications systems employing shared communications channels and shared frequency bands have drawbacks, however, in that they have generally been incapable of providing data transmission rates that are appropriate for all multi-media data services. For example, with respect to wireless communications systems operating in the shared frequency band for WLANs located at 5 GHz, more than one WLAN operating in the shared 5 GHz band may be deployed within the same geographical area due to the unlicensed nature of the 5 GHz band. In addition, radar and other types of wireless communications systems, either operating in the shared 5 GHz band or generating frequency harmonics having components in the 5 GHz band, may also be deployed within the same geographical area. As a result, the communications channels available to such wireless communications systems deployed within a particular geographical area may have increased levels of noise and interference, which can hinder the systems' ability to maintain the desired high rates of data transmission.

It would therefore be desirable to have an improved wireless broadband communications system that provides higher performance and increased spectral efficiency in point-to-point and point-to-multipoint applications. Such a high performance wireless broadband communications system would allow increased rates of data transmission in both LOS and NLOS environments, while avoiding the drawbacks of the above-described conventional wireless communications systems.

BRIEF SUMMARY OF THE INVENTION

In accordance with the present invention, a wireless broadband communications system is disclosed that provides higher performance and increased spectral efficiency in point-to-point and point-to-multipoint applications. The presently disclosed wireless communications system achieves such enhanced performance and spectral efficiency by an adaptive modulation technique that determines information relating to a current condition or "state" of the propagation path between corresponding pairs of transmit and receive antennas for each communications channel available to the system, and selects an optimal transmission modulation mode and either a single channel or multiple channels of information flow for a given communications session based at least in part upon the current channel state information. The presently disclosed wireless communications system allows increased rates of data transmission in both line-of-sight (LOS) and non-line-of-sight (NLOS) environments.

In one embodiment, the disclosed wireless broadband communications system includes a plurality of transceivers and a plurality of transmit and receive antennas. The plurality of transceivers and the plurality of transmit and receive antennas are configured and arranged to transmit and receive signals over one or more communications channels. The wireless communications system can be configured as a single input multiple output (SIMO) system that transmits and receives signals over a single channel of information flow, or a multiple input multiple output (MIMO) system that transmits and receives signals over multiple channels of information flow. In the presently disclosed embodiment, the wireless communications system includes a respective transmitter, a respective receiver, and a respective pair of antennas disposed at each end of a communications link. The system can therefore be configured as a 1:2 SIMO system or a 2:2 MIMO system. The wireless communications system may be deployed in an LOS environment such as a reduced scattering suburban or rural environment, or in an NLOS environment such as a high scattering urban environment including numerous scattering objects and obstructions, e.g., buildings, trees, hills, and/or automobiles.

The presently disclosed wireless broadband communications system achieves enhanced performance and spectral efficiency by an adaptive modulation technique that determines information relating to the current state of the propagation path between two corresponding pairs of transmit and receive antennas for each communications channel available to the system, and selects an optimal transmission modulation mode and either a single channel of information flow or dual channels of information flow for a given communications session based at least in part upon the current channel state information. In one mode of operation, the adaptive modulation technique employs two non-overlapping sets of pilot signals to determine the information relating to the current states of the respective propagation paths between the two corresponding pairs of transmit and receive antennas. In one embodiment, the adaptive modulation technique employs pilot carriers in an orthogonal frequency division modulation (OFDM) waveform to transmit the pilot signals along the respective propagation paths over orthogonal channels. To assure that the channel state information can be determined separately for each channel of information flow, the adaptive modulation technique employs separate sets of OFDM carriers when transmitting the pilot signals along the propagation paths corresponding to the respective channels of information flow. The transmitter and the pair of antennas disposed at a first end of the communications link operate to modulate and transmit the two non-overlapping sets of pilot signals along four propagation paths over the respective communications channels. Next, the receiver and the pair of antennas disposed at a second end of the communications link operate to receive and demodulate the two non-overlapping sets of pilot signals.

In the presently disclosed embodiment, the receive demodulator includes multiple sets of matched filters, and each set of pilot signals and each receive antenna is associated with a respective one of the sets of matched filters. Further, the channel state information associated with each frequency ("tone") of the pilot signals is represented by a four element matrix (the "channel state matrix"), in which each element of the matrix corresponds to one of the propagation paths between the two corresponding pairs of transmit and receive antennas. Each output of a set of matched filters associated with a respective set of pilot signals corresponds to the instantaneous value of one of the elements of the channel state matrix at the associated pilot tone. In the disclosed embodiment, the two sets of pilot signals are transmitted by the transmitter in multiple OFDM bursts, and the outputs of the sets of matched filters associated with the respective sets of pilot signals are averaged to obtain average values of the elements of the channel state matrices at the associated pilot tones. The information contained in each channel state matrix is used to perform channel equalization, and to obtain measurements of the average vector error associated with the single channel of information flow (the "single payload mode") and the dual channels of information flow (the "dual payload mode") for the given communications session. The single payload mode corresponds to the 1:2 SIMO configuration of the disclosed wireless communications system, and the dual payload mode corresponds to the 2:2 MIMO configuration of the disclosed system.

The adaptive modulation technique selects an optimal transmission modulation mode and either the single payload mode or the dual payload mode for the given communications session based upon the information contained in the channel state matrices and the average vector error measurement values for the single and dual payload modes. In the presently disclosed embodiment, the adaptive modulation technique makes the above-described selections using a predetermined set of variable data and a predetermined set of constant data. The set of variable data includes the current transmission modulation mode, the average vector error ("ave_vec_err") measurement values for the single and dual payload modes, a modulation mode "transition-up" margin ("up_margin") value, a modulation mode "transition-down" margin ("down_margin") value, the mean square of the magnitudes of the determinants of the channel state matrices ("mean_sqr_A"), and an imbalance estimate value ("mean_sqr_B") calculated from the channel state matrices.

The set of constant data includes a modulation mode transition-up/vector error threshold ("up_margin_vec_err_thresh") value, a modulation mode transition-down/vector error threshold ("down_margin_vec_err_thresh") value, and a threshold value corresponding to the mean_sqr_A value ("thresh_mean_sqr_A"). The up_margin_vec_err_thresh value is associated with each transmission modulation mode below the modulation mode corresponding to the maximum rate of data transmission. The up_margin_vec_err_thresh value is equal to the average measured vector error for a given payload mode when, for the same channel, the communications link would be at the specified threshold of operation if the system were in operating in the next modulation mode. The down_margin_vec_err_thresh value is associated with each transmission modulation mode above the modulation mode corresponding to the minimum rate of data transmission. The down_margin_vec_err_thresh value is equal to the average measured vector error when the current modulation mode is at the specified threshold of operation. The thresh_mean_sqr_A value can be determined empirically.

In the presently disclosed embodiment, the adaptive modulation technique employs the following list of combinations of transmission modulation mode and single/dual payload mode:

1. BPSK/single payload
2. QPSK/single payload
3. 16 QAM/single payload
4. 16 QAM/dual payload
5. 64 QAM/dual payload
6. 256 QAM/dual payload, in which "BPSK" corresponds to binary phase shift keying, "QPSK" corresponds to quadrature phase shift keying, and "QAM" corresponds to quadrature amplitude modulation. Further, "BPSK/single payload" is the modulation mode/payload mode combination corresponding to the lowest rate of data transmission, and "256 QAM/dual payload" is the modulation mode/payload mode combination corresponding to the highest rate of data transmission. In the disclosed adaptive modulation technique, a transition-up to the next modulation mode/payload mode combination corresponding to the next higher rate of data transmission is performed when the following conditions are met:

1. The current transmission modulation mode does not correspond to the highest rate of data transmission.

2. [(ave_vec_err)−(up_margin)]<(up_margin_vec_err_thresh)

3. If the current modulation mode/payload mode combination is 16 QAM/single payload, then the following conditions are met:
   a. mean_sqr_A>thresh_mean_sqr_A
   b. (mean_sqr_A)/4>mean_sqr_B.

In addition, a transition-down to the next modulation mode/payload mode combination corresponding to the next lower rate of data transmission is performed when the following conditions are met:

1. The current transmission modulation mode does not correspond to the lowest rate of data transmission.

2. [(ave_vec_err)-(down_margin)]>(down_margin_vec_err_thresh).

The adaptive modulation technique can determine whether to transition-up or transition-down to the next modulation mode/payload mode combination in any desired order, and can make such determinations at any suitable time, e.g., once every period of system operation.

By providing a wireless broadband communications system that employs an adaptive modulation technique to determine information relating to the current state of the propagation path between corresponding pairs of transmit and receive antennas for each communications channel available to the system, and to select an optimal transmission modulation mode and either a single payload or a dual payload mode of operation for a given communications session based at least in part upon the current channel state information, increased rates of data transmission can be achieved in both LOS and NLOS wireless communications environments.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

The entire disclosure of U.S. Provisional Patent Application No. 60/644,281 filed Jan. 14, 2005 entitled DUAL PAYLOAD AND ADAPTIVE MODULATION is incorporated herein by reference.

A wireless broadband communications system is disclosed that provides higher performance and increased spectral efficiency in point-to-point and point-to-multipoint applications. The presently disclosed wireless communications system employs an adaptive modulation technique that determines information relating to a current condition or "state" of the propagation path between corresponding pairs of transmit and receive antennas for each communications channel available to the system, and selects an optimal transmission modulation mode and either a single channel of information flow (the "single payload mode") or dual channels of information flow (the "dual payload mode") for a given communications session based at least in part upon the current channel state information. The disclosed wireless communications system allows increased rates of data transmission in both line-of-sight (LOS) and non-line-of-sight (NLOS) environments.

Figure 1:
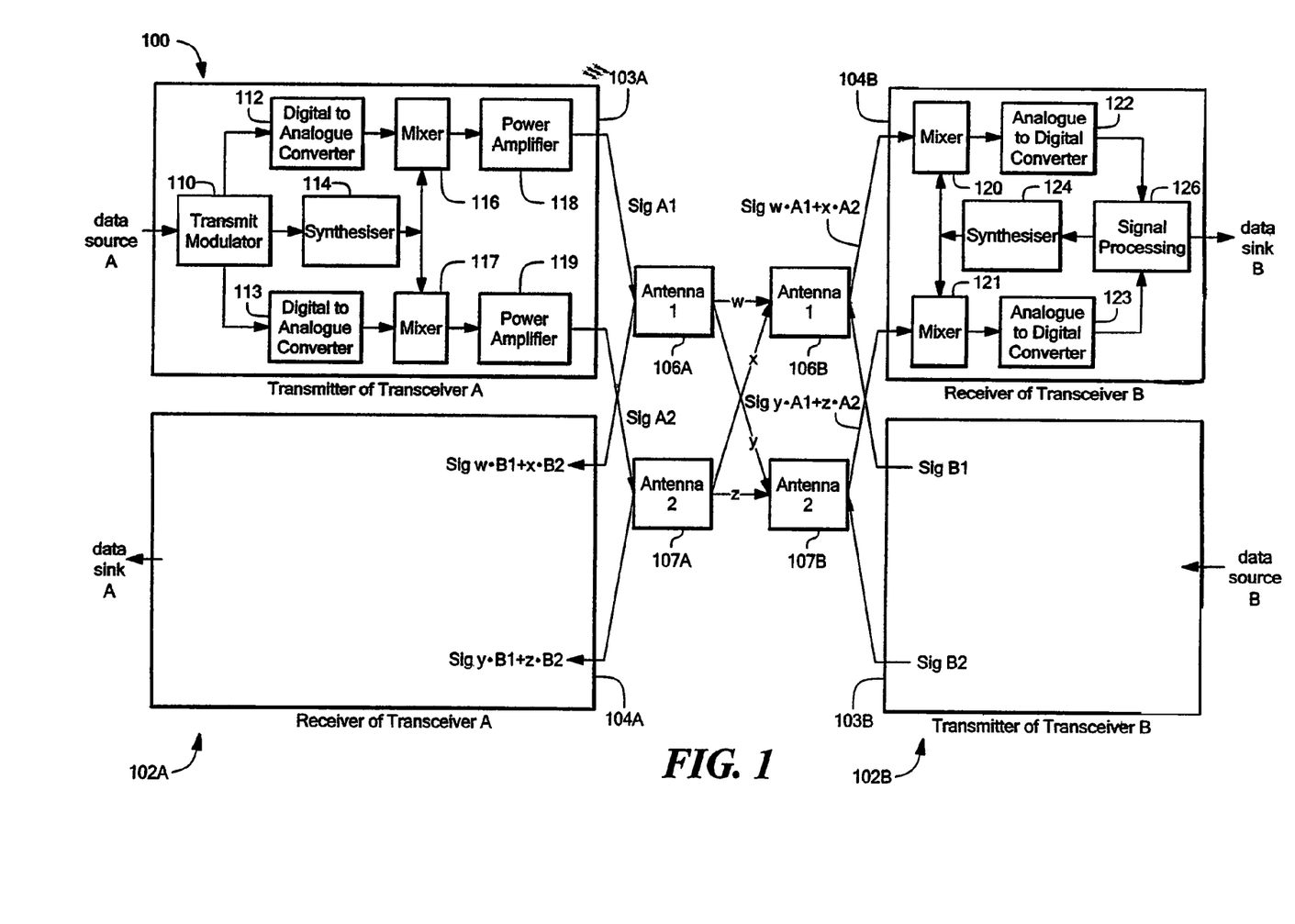
FIG. 1 is a block diagram of a wireless broadband communications system operable as a 1:2 SIMO system (single payload mode) or a 2:2 MIMO system (dual payload mode) according to the present invention.

FIG. 1 depicts an illustrative embodiment of a wireless broadband communications system 100 operable in the single payload mode or the dual payload mode, in accordance with the present invention. In the illustrated embodiment, the wireless communications system 100 includes a plurality of transceivers 102A-102B and a plurality of high gain antennas 106A-107A, 106B-107B. It is understood that the transceiver 102A and the high gain antennas 106A-107A can be disposed at one end of a communications link (not numbered), and the transceiver 102B and the high gain antennas 106B-107B can be disposed at the other end of the link. While operating in the single payload mode, the wireless communications system 100 can be configured as a 1:2 single input multiple output (SIMO) system that transmits and receives signals over a single channel of information flow. While operating in the dual payload mode, the wireless communications system 100 can be configured as a 2:2 multiple input multiple output (MIMO) system that transmits and receives signals over two channels of information flow. It is appreciated, however, that the wireless communications system 100 may alternatively be configured as a 1:4 SIMO system, 1:n SIMO system, or any other suitable type of SIMO system while operating in the single payload mode. It is further appreciated that the wireless communications system 100 may alternatively be configured as a 2:4 MIMO system, a 2:n MIMO system, an n:n MIMO system, or any other suitable type of MIMO system while operating in the dual payload mode. The wireless communications system 100 of FIG. 1 is described herein as being configurable as either a 1:2 SIMO system in the single payload mode or a 2:2 MIMO system in the dual payload mode for purposes of illustration.

As shown in FIG. 1, the wireless communications system 100 includes the transceiver 102A operatively connected to the antennas 106A-107A at one end of the communications link, and the transceiver 102B operatively connected to the antennas 106B-107B at the other end of the link. The antennas 106A-107A, 106B-107B are operative to transmit and receive signals propagating along four signal paths w, x, y, z between the respective ends of the link. The transceiver 102A includes a transmitter 103A and a low noise receiver 104A, and the transceiver 102B includes a transmitter 103B and a low noise receiver 104B. The transmitter 103A includes the following functional components: a transmit modulator 110, digital-to-analog (D-to-A) converters 112-113, a frequency synthesizer 114, mixers 116-117, and high power amplifiers 118-119. It is understood that the transmitter 103B can include the same functional components as the transmitter 103A. FIG. 1 depicts the functional components of the transmitter 103A for clarity of illustration.

Specifically, a data source A provides user data to the transmit modulator 110, which provides modulated data outputs to the D-to-A converters 112-113 and controls the operation of the synthesizer 114. The D-to-A converters 112-113 convert the transmit modulator outputs to analog signals, and provide the analog signals to the mixers 116-117. Next, the synthesizer 114 provides suitable synthesized carriers to the mixers 116-117, which mix up the analog signals to wireless frequencies. The power amplifiers 118-119 then amplify the wireless signals, and provide the amplified signals to the antennas 106A-107A for subsequent transmission over the communications link.

The receiver 104B includes the following functional components: mixers 120-121, analog-to-digital (A-to-D) converters 122-123, a frequency synthesizer 124, and a signal processor 126. It is understood that the receiver 104A can include the same functional components as the receiver 104B. FIG. 1 depicts the functional components of the receiver 104B for clarity of illustration. Specifically, the wireless signals received by the antennas 106B-107B are provided to the mixers 120-121, respectively, which mix the signals to analog baseband signals using suitable synthesized frequencies generated by the synthesizer 124. Next, the A-to-D converters 122-123 convert the analog baseband signals to digital baseband signals. The signal processor 126 then processes (e.g., decodes and demodulates) the digital signals to recover the user data, which is subsequently provided to a data sink B. The signal processor 126 also controls the operation of the synthesizer 124. In one embodiment, the signal processor 126 operates as a maximum ratio combiner (MRC; also known as an optimum combiner), which combines the signals by conceptually rotating the phase of each signal to be in alignment, and then adjusting the amplitude of each signal to maximize the combined signal-to-noise ratio.

It is noted that the data sources A-B and the data sinks A-B may comprise respective connections to one or more local area networks (LANs) or routers. Alternatively, the data sources A-B and the data sinks A-B may comprise direct connections to respective user devices. In addition, each one of the transceivers 102A-102B may be implemented as a software-defined radio. For example, the transmit modulator 110 included in each transmitter 103A-103B may employ channel modulation waveforms that are defined in software, and the signal processor 126 (also referred to herein as the "receive demodulator") included in each receiver 104A-104B may demodulate the channel waveforms using demodulation techniques that are defined in software. It should be appreciated, however, that the functions necessary to implement the transceivers 102A-102B may be embodied in whole or in part using hardware or software or some combination thereof using signal processors, micro-controllers, microprocessors, or any other suitable hardware and/or software.

As described above, the wireless broadband communications system 100 can be configured to operate in an LOS environment such as a reduced scattering suburban or rural environment, or in an NLOS environment such as a high scattering urban environment including numerous scattering objects and obstructions, e.g., buildings, trees, hills, and/or automobiles. When the wireless communications system 100 is configured to operate in NLOS environments, the system 100 has the following capabilities: (1) the capability of overcoming losses due to scattering objects and obstructions in the environment (also known as excess path loss), (2) the capability of mitigating signal fading, and (3) the capability of operating in dispersive channels. In the presently disclosed embodiment, the wireless communications system 100 overcomes excess path loss by providing a high system gain, which is achieved via the high power amplifiers 118-119, the low noise receivers 104A-104B, and the high gain antennas 106A-107A, 106B-107B (see FIG. 1). Further, the wireless communications system 100 mitigates signal fading, which generally accompanies the excess path loss, by employing a suitable space-time coding technique in combination with suitable diversity modes, e.g., polarization diversity, delay diversity, and spatial diversity. Moreover, the wireless communications system 100 provides the capability of operating in a dispersive channel by employing orthogonal frequency division modulation (OFDM) to accommodate the level of dispersion in the channel and the channel dynamics. Details of the various components included in the wireless communications system 100 of FIG. 1 are further described in co-pending U.S. patent application Ser. No. 11/115,943 filed Apr. 27, 2005 entitled MULTIPLE INPUT MULTIPLE OUTPUT (MIMO) WIRELESS COMMUNICATIONS SYSTEM (the "'943 application"), the entire disclosure of which is incorporated herein by reference.

Figure 2:
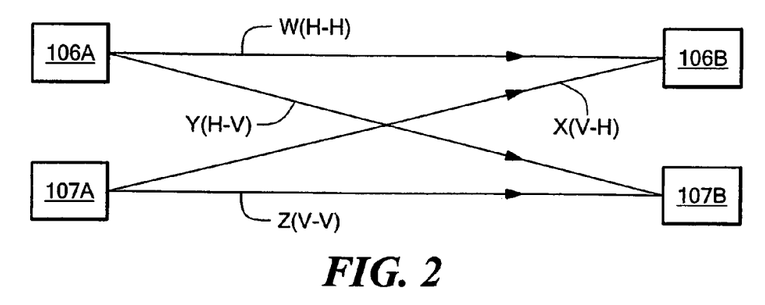
FIG. 2 is a diagram of an illustrative signal path configuration employed by the wireless communications system of FIG. 1.

FIG. 2 depicts a simplified representation of the four signal propagation paths w, x, y, z between the antennas 106A-107A, 106B-107B of the wireless communications system 100 (see also FIG. 1). In the presently disclosed embodiment, each pair of antennas 106A-107A and 106B-107B can have a predetermined spacing to provide spatial diversity. In addition, each one of the antennas 106A-106B can be a horizontally polarized antenna, and each one of the antennas 107A-107B can be a vertically polarized antenna, thereby providing polarization diversity. In this illustrative embodiment, the propagation path w is a horizontally polarized path, as indicated by the horizontal-to-horizontal (H-H) path designation, and the propagation path z is a vertically polarized path, as indicated by the vertical-to-vertical (V-V) path designation.

When the wireless communications system 100 is configured to operate in NLOS environments, the scattering of the transmitted signals propagating through the environment can cause polarization conversion to take place along the propagation paths x, y, as indicated by the vertical-to-horizontal (V-H) and horizontal-to-vertical (H-V) path designations, respectively. It is understood that polarization conversion may also result from the polarizations of the antennas 106A-107A and 106B-107B not being precisely aligned, and from the twisting of the polarizations as the transmitted signals propagate through the atmosphere.

Although co-polar signals H-H, V-V are described herein as propagating along the horizontally polarized path w and the vertically polarized path z, respectively, it should be understood that the co-polar signals H-H, V-V (and the cross polar signals V-H, H-V propagating along the paths x and y, respectively) may correspond to any suitable linear or circular orthogonal polarizations. For example, the linear orthogonal polarizations may correspond to any suitable linear orthogonal angles, and the circular orthogonal polarizations may correspond to any suitable right hand circular and left hand circular orthogonal polarizations. It should also be understood that such linear or circular orthogonal polarizations may be only nominally orthogonal. For example, in the event horizontal and vertical linear orthogonal polarizations are employed, the linear orthogonal angles corresponding to the horizontal and vertical linear polarizations may be +30° and −60°, 0° and ±90°, 0° and ±80°, or any other suitable orthogonal or nominally orthogonal angles.

The wireless broadband communications system 100 (see FIG. 1) provides higher performance and increased spectral efficiency in point-to-point and point-to-multipoint applications by an adaptive modulation technique that determines information relating to the current states of the propagation paths w, x, y, z between the antennas 106A-107A and 106B-107B, and selects an optimal transmission modulation mode and either the single payload mode or the dual payload mode of operation based at least in part on the current channel state information. It is noted that in the single payload mode of operation, the wireless communications system 100 transmits signals over a single channel of information flow along the propagation paths w and z, and in the dual payload mode of operation, the system 100 transmits signals over two channels of information flow along the propagation paths w and z, respectively.

In the presently disclosed embodiment, the adaptive modulation technique employs two non-overlapping sets of pilot signals to determine the information relating to the current states of the respective propagation paths w, x, y, z between the antennas 106A-107A and 106B-107B (see FIG. 1). Specifically, the adaptive modulation technique employs pilot carriers in an orthogonal frequency division modulation (OFDM) waveform to transmit the pilot signals along the respective paths w, x, y, z over orthogonal channels. To assure that the channel state information can be determined separately for each of the single payload and dual payload modes of operation, the adaptive modulation technique employs separate sets of OFDM carriers when transmitting the two non-overlapping sets of pilot signals.

It is noted that each pilot carrier employed by the presently disclosed adaptive modulation technique is typically like the carrier used in amplitude modulation (AM) or the suppressed carrier used in single sideband (SSB) operation. Further, the OFDM carriers used to transmit the two non-overlapping sets of pilot signals along the propagation paths w, x, y, z are selected to be sufficient for allowing the adaptive modulation technique to determine the complex impulse responses of the respective paths w, x, y, z.

For example, the transmitter 103A (see FIG. 1) may provide one of the two non-overlapping sets of pilot signals to the antenna 106A within a signal SigA1, and may provide the other one of the two non-overlapping sets of pilot signals to the antenna 107A within a signal SigA2. Following transmission from the antennas 106A, 107A, the signals SigA1, SigA2 can propagate along the signal paths w, z as co-polar signals and along the signal paths x, y as cross polar signals, thereby causing signals Sig(wA1+xA2), Sig(yA1+zA2) to be received by the antennas 106B, 107B and the receiver 104B. The transmitter 103A and the antennas 106A-107A operate to modulate and transmit the two non-overlapping sets of pilot signals along the propagation paths w, x, y, and z, and the antennas 106B-107B and the receiver 104B operate to receive and demodulate the two non-overlapping sets of pilot signals.

It is understood that the transmitter 103B (see FIG. 1) may similarly provide one of the two non-overlapping sets of pilot signals to the antenna 106B within a signal SigB1, and may provide the other one of the two non-overlapping sets of pilot signals to the antenna 107B within a signal SigB2. Following transmission from the antennas 106B, 107B, the signals SigB1, SigB2 propagate in reverse directions along the signal paths w, z as co-polar signals and along the signal paths x, y as cross polar signals, thereby causing signals Sig(wB1+xB2), Sig(yB1+zB2) to be received by the antennas 106A, 107A and the receiver 104A.

Figure 3:
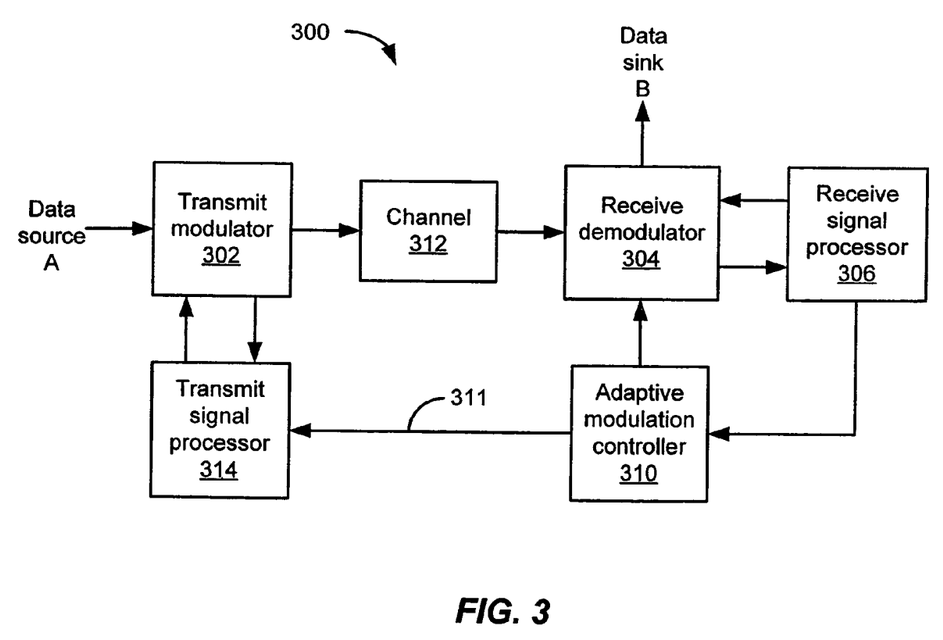
FIG. 3 is a block diagram of an adaptive modulation subsystem implemented within the wireless communications system of FIG. 1.

FIG. 3 depicts an illustrative embodiment of an adaptive modulation sub-system 300 operative to implement the disclosed adaptive modulation technique within the wireless communications system 100 (see FIG. 1). As shown in FIG. 3, the adaptive modulation sub-system 300 includes a transmit modulator 302, a receive demodulator 304, a receive signal processor 306, an adaptive modulation controller 310, and a transmit signal processor 314. In the presently disclosed embodiment, the transmit modulator 302 generally corresponds to the transmit modulator 110 included in the transmitter 103A or 103B (see FIG. 1), and the receive demodulator 304 generally corresponds to the signal processor 126 included in the receiver 104A and 104B (see FIG. 1). Further, it is understood that the transmit signal processor 314 is included in the transmitter 103A or 103B, and the receive signal processor 306 and the adaptive modulation controller 310 are included in the receiver 104A and 104B. It should be appreciated that the functions necessary to implement the transmit modulator 302, the receive demodulator 304, the receive signal processor 306, the adaptive modulation controller 310, and the transmit signal processor 314 may be embodied in whole or in part using hardware or software or some combination thereof.

As shown in FIG. 3, at least one representative channel 312 is disposed between the transmit modulator 302 and the receive demodulator 304. The channel 312 represents at least one of the communications channels available to the wireless communications system 100. The receive signal processor 306 is operative to determine the impulse response of the representative channel 312 using the above-described non-overlapping sets of pilot signals, and to provide an indication of the channel estimate to the adaptive modulation controller 310. In the presently disclosed embodiment, the channel impulse response can be represented by a four element matrix (the "channel state matrix"), in which each element of the matrix corresponds to one of the propagation paths w, x, y, z between the antennas 106A-107A, 106B-107B. For example, the channel state matrix may be expressed as $$\begin{bmatrix} w & x \\ y & z \end{bmatrix} = \begin{bmatrix} A_1 \rightarrow A_1 & A_1 \rightarrow A_2 \\ A_2 \rightarrow A_1 & A_2 \rightarrow A_2 \end{bmatrix}, \quad (1)$$

in which "$A_1$" and "$A_2$" correspond to the signals SigA1 and SigA2, respectively, transmitted by the transmitter 103A (see FIG. 1), "$A_1 \rightarrow A_1$" and "$A_2 \rightarrow A_2$" represent information corresponding to the signals SigA1 and SigA2 propagating along the signal paths w and z, respectively, and "$A_1 \rightarrow A_2$" and "$A_2 \rightarrow A_1$" represent information corresponding to the crosstalk that can occur between the signals SigA1 and SigA2 along the signal paths x and y, respectively. The adaptive modulation controller 310 is operative to select an optimal transmission modulation mode and either the single payload or the dual payload mode of operation for the given communications session based at least in part upon the current channel state information contained in the channel state matrix, and to provide indications of these selections to the receive demodulator 304, and to the transmit signal processor 314 via feedback over a signal path 311 (see FIG. 3). The transmit signal processor 314 is operative to perform preconditioning of the transmission data, if necessary, based upon the modulation and payload mode selections, and to provide the preconditioned data to the transmit modulator 302 for subsequent transmission.

It is noted that the determinant R of the channel state matrix of equation (1) above may be expressed as $$R = w^*z - x^*y. \quad (2)$$

Further, the channel state matrix of equation (1) may generally be expressed as $$\begin{bmatrix} w & x \\ y & z \end{bmatrix} * K, \quad (3)$$

in which "K" is a constant value dependent upon the range of the wireless communications system. Those of ordinary skill in this art will appreciate that the communications channels available to a wireless communications system can be regarded as being substantially orthogonal when the determinant R (see equation (2)) of the corresponding channel state matrix is large, i.e., when the product of the matrix elements x, y is small relative to the product of the matrix elements w, z. Such a system having substantially orthogonal channels available to it can operate in the dual payload mode.

In one embodiment, a wireless communications system having substantially orthogonal channels suitable for operation in the dual payload mode includes coincident antennas with orthogonal polarizations. For such a system, the corresponding channel state matrix includes elements x, y that are generally small, and elements w, z that are substantially equal and normally large relative to the elements x, y. In the dual payload mode, such a system can transmit two payloads of transmission data, e.g., a first payload of transmit information from the antenna 106A (see FIG. 1) and a second payload of transmit information from the antenna 107A (see FIG. 1). Further, the transmission from the antenna 106A can be separated from the transmission from the antenna 107A at the receiver 104B (see FIG. 1) without noise amplification. In this embodiment, the orthogonal polarizations of the antennas may be vertical and horizontal, right circular and left circular, or any other suitable orthogonal polarizations.

In another embodiment, a wireless communications system having substantially orthogonal channels suitable for operation in the dual payload mode includes an antenna polarization orientation that is not the same at each end of the communications link. For such a system, the channel state matrix may be expressed as $$\begin{bmatrix} \cos(a) & \sin(a) \\ -\sin(a) & \cos(a) \end{bmatrix} * K, \quad (4)$$

in which "K" is a constant value dependent upon the range of the system. The determinant R of the channel state matrix of equation (4) may therefore be expressed as $$R = w*z - x*y = \cos(a)\cos(a) - (-\sin(a)\sin(a)) = \cos^2(a) + \sin^2(a) = 1. \quad (5)$$

Because the channel state matrix elements w and z are large relative to the matrix elements x and y, such a system can operate in the dual payload mode for transmitting two payloads of transmission data.

In still another embodiment, a wireless communications system having substantially orthogonal channels suitable for operation in the dual payload mode includes antennas (e.g., the antennas 106A, 107A and 106B, 107B; see FIG. 1) that are spatially diverse. In one embodiment, the spacing between the antennas may be about 30 m, and the range of the system may be about 40 km. Further, the channel state matrix may be expressed as $$\begin{bmatrix} 1 & \exp(i\frac{\pi}{4}) \\ \exp(i\frac{\pi}{4}) & 1 \end{bmatrix} * K, \quad (6)$$

in which "K" is a constant value dependent upon the range of the system, and the determinant R of the channel state matrix may be expressed as $$R = w*z - x*y = 1*1 - i*i = 2. \quad (7)$$

Because the channel state matrix elements w and z are large relative to the matrix elements x and y, such a system can operate in the dual payload mode for transmitting two payloads of transmission data. It is noted that, in this embodiment, the polarization of the antennas may be vertical, horizontal, or any other suitable polarization. Further, the spacing orientation of the antennas may be either vertical or horizontal, and may be substantially the same for the transmit and receive antennas.

In one embodiment, the receive demodulator 304 included in the adaptive modulation sub-system 300 (see FIG. 3) includes multiple sets of matched filters (not shown), and each set of pilot signals and each receive antenna is associated with a respective one of the sets of matched filters. Further, the channel state information associated with each frequency ("tone") of the pilot signals can be represented by a channel state matrix like the one expressed in equation (1) above. Each output of a set of matched filters associated with a respective set of pilot signals corresponds to the instantaneous value of one of the elements of the channel state matrix at the associated pilot tone.

As described above, the transmitter 103A included in the wireless communications system 100 (see FIG. 1) modulates the two non-overlapping sets of pilot signals prior to transmission along the propagation paths w, x, y, and z. Because the adaptive modulation technique employs pilot carriers in an OFDM waveform to transmit the two sets of pilot signals along the respective paths w, x, y, z over orthogonal channels, the receive demodulator 304 (see FIG. 3) can separate the channel responses associated with the respective sets of pilot signals. In the presently disclosed embodiment, the two non-overlapping sets of pilot signals are transmitted by the transmitter 103A in multiple OFDM bursts, e.g., consecutive pairs of OFDM bursts. In one embodiment, the transmitter 103A performs on/off modulation of the pilot signals such that in the first OFDM burst of a pair of bursts, "even" pilot tones are energized for the signal output provided by the antenna 106A, and "odd" pilot tones are energized for the signal output provided by the antenna 107A. Next, in the second OFDM burst of the pair of bursts, the odd pilot tones are energized for the signal output from the antenna 106A, and the even pilot tones are energized for the signal output from the antenna 107A.

Accordingly, in the presently disclosed wireless communications system, the channel state matrix can be determined using pilot tones within an OFDM symbol structure. Specifically, the pilot tones are a subset of sub-carriers in the OFDM symbols having a predetermined phase, i.e., they do not carry data payload. To allow the determination of the channel state matrix, the symbols transmitted from each antenna are configured to carry mutually exclusive sets of pilot tones, e.g., if a pilot tone is present in the transmission from one transmit antenna, then that pilot tone is absent from the transmission from the other transmit antenna or antennas. Further, the channel characteristics of each propagation path between the antennas can be built up over time as a function of frequency, but without significant impact upon the data payload capacity. It should be understood that the disclosed wireless communications system may employ any suitable permutation of the number of pilots in relation to the data carrying sub-carriers, the position of the pilots within the OFDM spectrum, and the duty cycle of any alternation between pilots and data sub-carriers.

Figure 4:
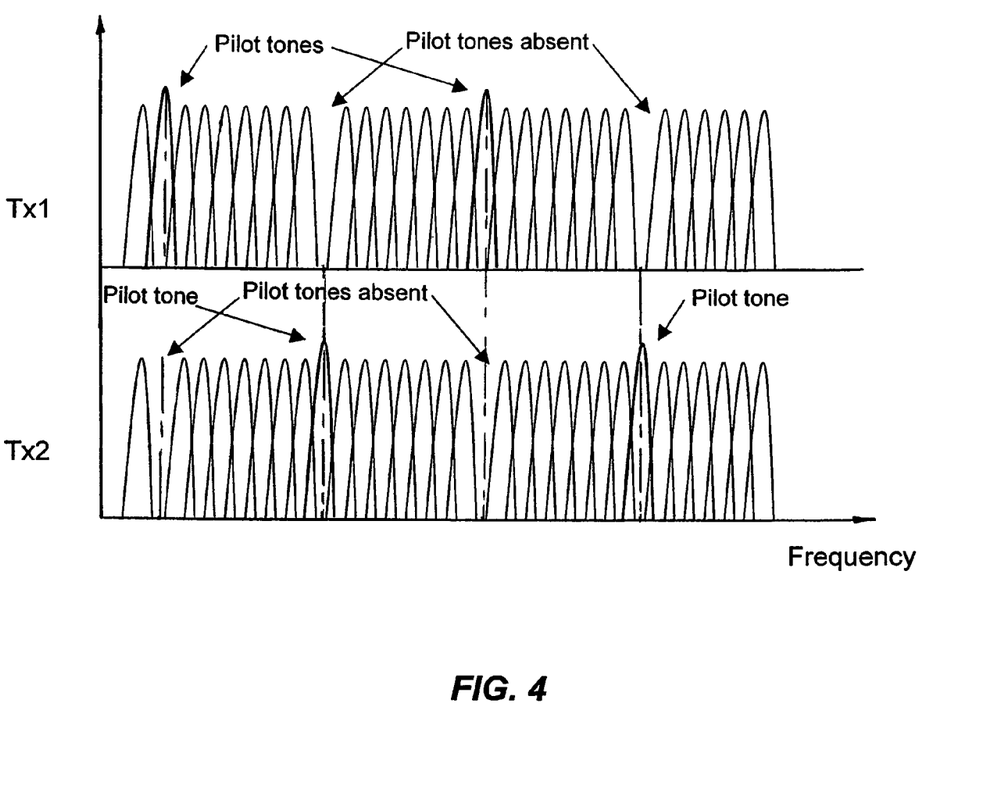
FIG. 4 is a diagram of a pilot tone structure for use in determining channel state information by the wireless communications system of FIG. 1.

FIG. 4 depicts an illustrative pilot tone structure that may be employed in conjunction with the presently disclosed wireless communications system 100 (see FIG. 1). Specifically, the upper diagram of FIG. 4 illustrates the spectrum of a signal Tx1 transmitted from, e.g., the antenna 106A (see FIG. 1), and the lower diagram of FIG. 4 illustrates the spectrum of a signal Tx2 transmitted at the same time from, e.g., the antenna 107A (see FIG. 1). As shown in FIG. 4, the pilot tones included in the signal transmissions Tx1, Tx2 occupy mutually exclusive frequencies, thereby allowing the channel characteristics of the propagation paths w, x, y and z (see FIG. 1) to be determined separately. In one embodiment, the positions of the pilots transmitted from the antennas 106A, 107A may be alternated on alternate OFDM symbols to allow greater resolution in the equalization characteristic of each channel, which is built up over time as a function of frequency. It should be appreciated that any other suitable pilot tone structure may be employed within the disclosed wireless communications system 100.

The receive signal processor 306 included in the adaptive modulation sub-system 300 (see FIG. 3) averages the outputs of the sets of matched filters associated with the respective sets of pilot signals to obtain average values of the elements of the channel state matrices at the associated pilot tones. In one embodiment, the receive signal processor 306 averages the channel state information over 10 OFDM bursts. The receive signal processor 306 provides indications of this averaged channel state information to the receive demodulator 304 for use in performing channel equalization. In addition, the receive signal processor 306 uses the channel state information to obtain measurements of the average vector error associated with the single payload and the dual payload modes of operation for the given communications session.

As described above, the wireless communications system 100 (see FIG. 1) can be configured as a 1:2 SIMO system in the single payload mode of operation, and can be configured as a 2:2 MIMO system in the dual payload mode of operation. While operating in the single payload mode, the receive signal processor 306 (see FIG. 3) converts the channel state information from the channel state matrix format (see, e.g., equation (1)) to a channel state vector format suitable for use by the 1:2 SIMO system configuration before providing the information to the receive demodulator 304 for subsequent channel equalization. For example, the channel state matrix may be converted to a channel state vector by summing all of the elements corresponding to a respective receive antenna for a given pilot tone. It is understood that, while operating in the dual payload mode, the receive signal processor 306 can provide indications of the channel state information directly to the receive demodulator 304 in the channel state matrix format.

As further described above, the adaptive modulation controller 310 selects an optimal transmission modulation mode and either the single payload or the dual payload mode of operation for the given communications session based at least in part upon the current channel state information contained in the channel state matrix. In the presently disclosed embodiment, the adaptive modulation controller 310 makes these selections based upon the channel state information and the average vector error measurements for the single and dual payload modes, using a predetermined set of variable data and a predetermined set of constant data. For example, the adaptive modulation controller 310 may make such selections once every period of system operation, which is typically equal to about 1 msec, or at any other suitable time.

The set of variable data includes the current transmission modulation mode, the average vector error ("ave_vec_err") measurement values for the single and dual payload modes, a modulation mode "transition-up" margin ("up_margin") value, a modulation mode "transition-down" margin ("down_margin") value, the mean square of the magnitudes of the determinants of the channel state matrices ("mean_sqr_A"), and an imbalance estimate value ("mean_sqr_B") calculated from the channel state matrices. For example, the ave_vec_err measurement values may be obtained by filtering the instantaneous vector error estimates, and converting the filtered vector error estimates to dB. The ave_vec_err measurement values are typically within the range of 0 to −40 dB, with more negative measurement values for links having higher SNRs. The up_margin and down_margin values are also expressed in dB, and are typically within the range of 1 to 5 dB. The adaptive modulation technique may vary the up_margin and down_margin values to accommodate the channel dynamics or interference. Further, in the disclosed embodiment, the adaptive modulation technique may calculate the mean_sqr_A and mean_sqr_B values using a specified set of channel state matrices. For example, the number of carriers in the OFDM waveform may be equal to 1024, and one in eight of the carriers may be designated as pilot carriers, while the remaining carriers may be designated as data carriers. The set of channel state matrices can then be determined using this specified set of pilot tones. As indicated in equation (2), the determinant R of the channel state matrix may be expressed as $$R = w^*z - x^*y.$$

Accordingly, $$\text{mean\_sqr\_A} = \Sigma |R|^2. \tag{8}$$

It is noted that $$\text{mean\_sqr\_B} = \Sigma |v|^2, \tag{9}$$

in which $$v = w^*x + y^*z. \tag{10}$$

The set of constant data includes a modulation mode transition-up/vector error threshold ("up_margin_vec_err_thresh") value, a modulation mode transition-down/vector error threshold ("down_margin_vec_err_thresh") value, and a threshold value corresponding to mean_sqr_A ("thresh_mean_sqr_A"). The up_margin_vec_err_thresh value is associated with each transmission modulation mode below the modulation mode corresponding to the maximum rate of data transmission. The up_margin_vec_err_thresh value is equal to the average measured vector error for a given modulation mode when, for the same channel, the communications link would be at the specified threshold of operation if the system were in operating in the next modulation mode. The down_margin_vec_err_thresh value is associated with each transmission modulation mode above the modulation mode corresponding to the minimum rate of data transmission. The down_margin_vec_err_thresh value is equal to the average measured vector error when the current modulation mode is at the specified threshold of operation. It is noted that the thresh_mean_sqr_A value can be determined empirically.

In the presently disclosed embodiment, the adaptive modulation technique employs the following list of combinations of transmission modulation mode and single/dual payload mode:

1. BPSK/single payload
2. QPSK/single payload
3. 16 QAM/single payload
4. 16 QAM/dual payload
5. 64 QAM/dual payload
6. 256 QAM/dual payload, in which "BPSK" corresponds to binary phase shift keying, "QPSK" corresponds to quadrature phase shift keying, and "QAM" corresponds to quadrature amplitude modulation. Further, "BPSK/single payload" is the modulation mode/payload mode combination corresponding to the lowest rate of data transmission, and "256 QAM/dual payload" is the modulation mode/payload mode combination corresponding to the highest rate of data transmission. It is understood that any other suitable list of transmission modulation mode/payload mode combinations may be employed. In the disclosed adaptive modulation technique, a transition-up to the next modulation mode/payload mode combination corresponding to the next higher rate of data transmission is performed when the following conditions are met:

1. The current transmission modulation mode does not correspond to the highest rate of data transmission, e.g., the current modulation mode is not 256 QAM.

2. [(ave_vec_err)−(up_margin)]<(up_margin_vec_err_thresh)

3. If the current modulation mode/payload mode combination is 16 QAM/single payload, then the following conditions are met:
 a. mean_sqr_A>thresh_mean_sqr_A
 b. (mean_sqr_A)/4>mean_sqr_B.

In addition, a transition-down to the next modulation mode/payload mode combination corresponding to the next lower rate of data transmission is performed when the following conditions are met:

1. The current transmission modulation mode does not correspond to the lowest rate of data transmission, e.g., the current modulation mode is not BPSK.

2. [(ave_vec_err)−(down_margin)]>(down_margin_vec_err_thresh).

Figure 5:
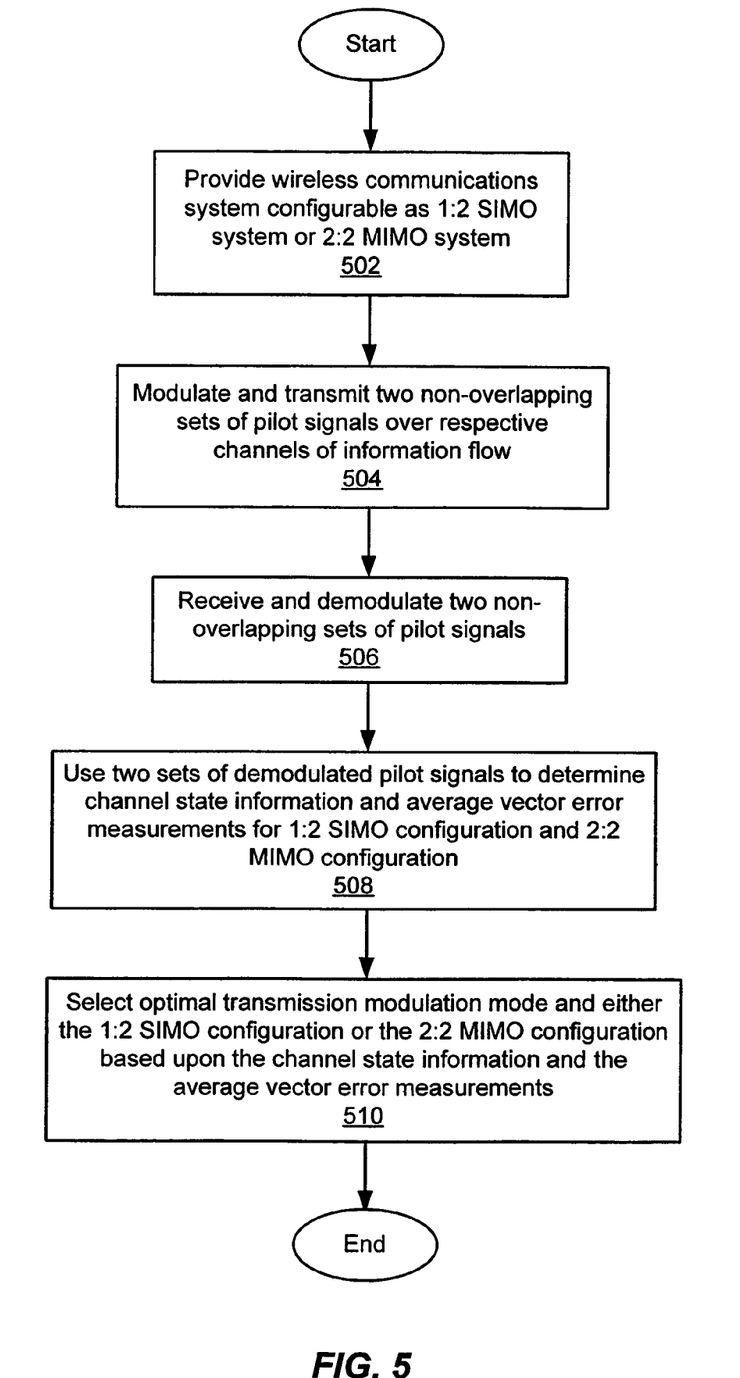
FIG. 5 is a flow diagram of a method of operating the wireless communications system of FIG. 1.

A method of operating a wireless broadband communications system in accordance with the presently disclosed adaptive modulation technique is described below with reference to FIG. 5. As depicted in step 502, a wireless broadband communications system is provided, in which the system is configurable as a 1:2 SIMO system having a single channel of information flow or as a 2:2 MIMO system having dual channels of information flow. Next, two non-overlapping sets of pilot signals are modulated and transmitted, as depicted in step 504, over the respective channels of information flow using predetermined pilot carriers in an OFDM waveform. The two sets of pilot signals are then received and demodulated, as depicted in step 506. Next, the two sets of demodulated pilot signals are used to determine channel state information and average vector error measurement values corresponding to the single channel of information flow for the 1:2 SIMO system configuration, and to the dual channels of information flow for the 2:2 MIMO system configuration, as depicted in step 508. An optimal transmission modulation mode and either the 1:2 SIMO system configuration or the 2:2 MIMO system configuration are then selected, as depicted in step 510, based upon the channel state information and the average vector error measurement values, as determined in step 508.

It will further be appreciated by those of ordinary skill in the art that modifications to and variations of the above-described wireless broadband communications system may be made without departing from the inventive concepts disclosed herein. Accordingly, the invention should not be viewed as limited except as by the scope and spirit of the appended claims.

What is claimed is:

1. A wireless broadband communications system, comprising:
 at least one transmitter;
 at least two transmit antennas, the transmitter and said at least two transmit antennas being configured and arranged to transmit at least one first signal over at least one communications channel, wherein said at least one signal comprises at least two non-overlapping sets of pilot signals and is capable of carrying at least one payload of information;
 at least one receiver, and
 at least two receive antennas, wherein the receiver and said at least two receive antennas are configured and arranged to receive said at least one first signal transmitted over said at least one channel,
 wherein the receiver is operative to determine channel state information from said at least one received signal, to select between a single payload mode and a dual payload mode of operation and at least one transmit characteristic based at least in part upon said channel state information, and to provide an indication of said payload mode and transmit characteristic selections to the transmitter,
 wherein the transmitter and said at least two transmit antennas are operative to transmit at least one second signal over said at least one channel in accordance with said payload mode and transmit characteristic selections,
 wherein:
 channel impulse responses are represented by channel state matrices in which elements of the matrices correspond to signals propagating along different paths between the transmit and receive antennas,
 selection of a transmission modulation mode and either the single or dual payload mode("modulation mode/payload mode combination") uses a set of variable data and a set of constant data,
 the set of variable data includes a current transmission modulation mode, average vector error ("ave_vec_err") measurement values for the single and dual payload modes, a modulation mode transition-up margin ("up_margin") value, a modulation mode transition-down margin ("down_margin") value, mean square of magnitudes of determinants of channel state matrices ("mean_sqr_A"), and an imbalance estimate value ("mean_sqr_B") calculated from the channel state matrices, and
 the set of constant data includes a modulation mode transition-up/vector error threshold ("up_margin_vec_err_thresh") value, a modulation mode transition-down/vector error threshold ("down_margin_vec_err_thresh") value, and a threshold value corresponding to mean_sqr_A ("thresh_mean_sqr_A"), the up_margin_vec_err_thresh value is associated with each transmission modulation mode below a modulation mode corresponding to a maximum rate of data transmission, the up_margin_vec_err_thresh value is equal to the average measured vector error for a given modulation mode when, for the same channel, the channel would be at a specified threshold of operation if the system were operating in the next modulation mode, the down_margin_vec_err_thresh value is associated with each transmission modulation mode above the modulation mode corresponding to a minimum rate of data transmission, the down_margin_vec_err_thresh value is equal to the average measured vector error when the current modulation mode is at the specified threshold of operation.

2. The system of claim 1 wherein, in the event the receiver selects the single payload mode of operation, the transmitter and said at least two transmit antennas are operative to transmit said at least one second signal carrying a single payload of information over said at least one channel.

3. The system of claim 1 wherein, in the event the receiver selects the dual payload mode of operation, the transmitter and said at least two transmit antennas are\operative to transmit said at least one second signal carrying two payloads of information over said at least one channel.

4. The system of claim 1 wherein the transmitter includes a transmit modulator configured to modulate said at least one first signal and said at least one second signal prior to transmission over said at least one channel.

5. The system of claim 4 wherein the receiver includes a receive demodulator configured to demodulate said at least one first signal and said at least one second signal.

6. The system of claim 5 wherein the receiver includes a receive signal processor operative to determine said channel state information from said demodulated signals.

7. The system of claim 6 wherein the receive signal processor is operative to obtain average vector error measurements associated with the single payload mode and the dual payload mode of operation using said channel state information.

8. The system of claim 7 wherein the receiver is operative to select between the single payload mode and the dual payload mode of operation based upon said channel state information and said average vector error measurements.

9. The system of claim 1 wherein the transmitter includes a transmit signal processor operative to precondition transmission data based at least in part upon said payload mode and transmit characteristic selections.

10. The system of claim 1 wherein, in the event the receiver selects the single payload mode of operation, said system operates as a single input multiple output (SIMO) system.

11. The system of claim 10 wherein said single input multiple output (SIMO) system comprises a 1:2 SIMO system.

12. The system of claim 1 wherein, in the event the receiver selects the dual payload mode of operation, said system operates as a multiple input multiple output (MIMO) system.

13. The system of claim 12 wherein said multiple input multiple output (MIMO) system comprises a 2:2 MIMO system.

14. The system of claim 1 wherein the transmitter and said at least two transmit antennas are configured and arranged to transmit said two non-overlapping sets of pilot signals from the two transmit antennas, respectively.

15. The system of claim 14 wherein each of said two non-overlapping sets of pilot signals has a corresponding set of pilot tones, the pilot tones corresponding to one set of pilot signals being substantially orthogonal to the pilot tones corresponding to the other set of pilot signals.

16. The system of claim 15 wherein each set of pilot tones corresponds to a single OFDM symbol.

17. The system of claim 15 wherein each set of pilot tones corresponds to a sequence of OFDM symbols.

18. The system of claim 1 wherein a first one of said at least two non-overlapping sets of pilot signals corresponds to a set of even pilot tones, and a second one of said at least two non-overlapping sets of pilot signals corresponds to a set of odd pilot tones.

19. The system of claim 1 wherein said at least two transmit antennas operate at different polarizations, and said at least two receive antennas operate at different polarizations.

20. The system of claim 19 wherein said at least two transmit antennas operate at the same polarizations as said at least two receive antennas.

21. The system of claim 19 wherein said at least two transmit antennas operate at polarizations different from said at least two receive antennas.

22. The system of claim 1 wherein said at least two transmit antennas operate at the same polarizations, and said at least two receive antennas operate at the same polarizations.

23. The system of claim 22 wherein said at least two transmit antennas are spatially separated by a first predetermined distance, and said at least two receive antennas are spatially separated by a second predetermined distance.

24. The system of claim 23 wherein said first predetermined distance equals said second predetermined distance.

25. A method of operating a wireless broadband communications system, comprising the steps of:

transmitting at least one first signal over at least one communications channel by at least one transmitter, the transmitter being operatively connected to at least two transmit antennas, wherein said at least one first signal comprises at least two non-overlapping sets of pilot signals and is capable of carrying at least one payload of information;

receiving said at least one first signal transmitted over said at least one channel by at least one receiver, the receiver being operatively connected to at least two receive antennas;

determining channel state information from said at least one received signal by the receiver;

selecting between a single payload mode and a dual payload mode of operation and at least one transmit characteristic based at least in part upon said channel state information by the receiver;

providing an indication of said payload mode and transmit characteristic selections to the transmitter; and transmitting at least one second signal over said at least one channel in accordance with said payload mode and transmit characteristic selections by the transmitter, wherein:

channel impulse responses are represented by channel state matrices in which elements of the matrices correspond to signals propagating along different paths between the transmit and receive antennas, selection of a transmission modulation mode and either the single or dual payload mode ("modulation mode/payload mode combination") uses a set of variable data and a set of constant data, the set of variable data includes a current transmission modulation mode, average vector error ("ave_vec_err") measurement values for the single and dual payload modes, a modulation mode transition-up margin ("up_margin") value, a modulation mode transition-down margin ("down$_{13}$margin") value, mean square of magnitudes of determinants of channel state matrices ("mean_sqr_A"), and an imbalance estimate value ("mean_sqr_B") calculated from the channel state matrices, and the set of constant data includes a modulation mode transition-up/vector error threshold ("up_margin_vec_err_thresh") value, a modulation mode transition-down/vector error threshold ("down_margin_vec_err_thresh") value, and a threshold value corresponding to mean_sqr_A ("thresh_mean_sqr_A"), the up_margin_vec_err_thresh value is associated with each transmission modulation mode below a modulation mode corresponding to a maximum rate of data transmission, the up_margin_vec_err_thresh value is equal to the average measured vector error for a given modulation mode when, for the same channel, the channel would be at a specified threshold of operation if the system were operating in the next modulation mode, the down_margin_vec_err_thresh value is associated with each transmission modulation mode above the modulation mode corresponding to a minimum rate of data transmission, the down_margin_vec_err_thresh value is equal to the average measured vector error when the current modulation mode is at the specified threshold of operation.

26. The method of claim 25 wherein the second transmitting step includes, in the event the single payload mode of operation is selected in the selecting step, transmitting said at least one second signal carrying a single payload of information over said at least one channel.

27. The method of claim 25 wherein the second transmitting step includes, in the event the dual payload mode of operation is selected in the selecting step, transmitting said at least one second signal carrying two payloads of information over said at least one channel.

28. The method of claim 25 including the step of modulating said at least one first signal and said at least one second signal prior to transmission over said at least one channel.

29. The method of claim 28 including the step of demodulating said at least one first modulated signal and said at least one second modulated signal.

30. The method of claim 29 wherein the determining step includes determining said channel state information from the demodulated signals.

31. The method of claim 30 including the step of obtaining average vector error measurements associated with the single payload mode and the dual payload mode of operation using said channel state information.

32. The method of claim 31 wherein the selecting step includes selecting between the single payload mode and the dual payload mode of operation based upon said channel state information and said average vector error measurements.

33. The method of claim 25 wherein said first transmitting step includes transmitting said at least two non-overlapping sets of pilot signals over said at least two channels from the two transmit antennas, respectively.

34. The method of claim 33 wherein each of said two non-overlapping sets of pilot signals has a corresponding set of pilot tones, the pilot tones corresponding to one set of pilot signals being substantially orthogonal to the pilot tones corresponding to the other set of pilot signals.

35. The method of claim 34 wherein each set of pilot tones corresponds to a single OFDM symbol.

36. The method of claim 34 wherein each set of pilot tones corresponds to a sequence of OFDM symbols.

37. The method of claim 25 wherein a first one of said at least two non-overlapping sets of pilot signals corresponds to a set of even pilot tones, and a second one of said at least two non-overlapping sets of pilot signals corresponds to a set of odd pilot tones.

38. The method of claim 25 including the steps of, in the event the single payload mode of operation is selected in the selecting step, configuring said system as a single input multiple output (SIMO) system, and in the event the dual payload mode is selected in the selecting step, configuring said system as a multiple input multiple output (MIMO) system.

39. The system of claim 1 wherein:
a transition-up to the next modulation mode/payload mode combination corresponding to the next higher rate of data transmission is performed when:
   the current transmission modulation mode does not correspond to the highest rate of data transmission,
   [(ave_vec_err)-(up_margin)]<(up_margin_vec_err_thresh), and
   if the payload mode is to switch from the single payload mode to the dual payload mode using the same modulation mode, then switching occurs when:
   mean_sqr_A >thresh_mean_sqr_A, and
   (mean_sqr_A)/4>mean_sqr_B, and
a transition-down to the next modulation mode/payload mode combination corresponding to the next lower rate of data transmission is performed when:
   the current transmission modulation mode does not correspond to the lowest rate of data transmission, and
   [(ave_vec_err)-(down_margin)]>(down_margin_vec_err_thresh).

40. The method of claim 25 wherein:
a transition-up to the next modulation mode/payload mode combination corresponding to the next higher rate of data transmission is performed when:
   the current transmission modulation mode does not correspond to the highest rate of data transmission,
   [(ave_vec_err)-(up_margin)]<(up_margin_vec_err_thresh), and
   if the payload mode is to switch from the single payload mode to the dual payload mode using the same modulation mode, then switching occurs when:
   mean_sqr_A>thresh_mean_sqr_A, and
   (mean_sqr_A)/4>mean_sqr_B, and
a transition-down to the next modulation mode/payload mode combination corresponding to the next lower rate of data transmission is performed when:
   the current transmission modulation mode does not correspond to the lowest rate of data transmission, and
   [(ave_vec_err)-(down_margin)]>(down_margin_vec_err_thresh).

* * * * *

UNITED STATES PATENT AND TRADEMARK OFFICE
CERTIFICATE OF CORRECTION

PATENT NO. : 7,656,969 B2
APPLICATION NO. : 11/332827
DATED : February 2, 2010
INVENTOR(S) : Strong It is certified that error appears in the above-identified patent and that said Letters Patent is hereby corrected as shown below:

IN THE CLAIMS

1. In Column 16, Line 4, in Claim 1, after "at least one", insert -- first --, therefor.

2. In Column 17, Line 3, in Claim 3, delete "after\operative" and insert -- after operative --, therefor.

3. In Column 18, Line 48, in Claim 25, delete "("down13margin")" and insert -- ("down_margin") --, therefor.

Signed and Sealed this
Eighth Day of November, 2011

David J. Kappos
*Director of the United States Patent and Trademark Office*